US012801962B2

(12) United States Patent
Saravanan et al.

(10) Patent No.: US 12,801,962 B2
(45) Date of Patent: Nov. 17, 2026

(54) QUANTUM COMPUTING DEVICE FOR DETECTING GROUPS OF INTERCONNECTED NODES IN A NETWORK

(71) Applicant: Telefonaktiebolaget LM Ericsson (publ), Stockholm (SE)

(72) Inventors: M Saravanan, Chennai (IN); Afrad Muhamed Basheer, Kerala (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 761 days.

(21) Appl. No.: 18/248,435

(22) PCT Filed: Oct. 12, 2020

(86) PCT No.: PCT/IN2020/050877
§ 371 (c)(1),
(2) Date: Apr. 10, 2023

(87) PCT Pub. No.: WO2022/079723
PCT Pub. Date: Apr. 21, 2022

(65) Prior Publication Data
US 2023/0394343 A1 Dec. 7, 2023

(51) Int. Cl.
*G06N 10/20* (2022.01)
*G06N 10/60* (2022.01)

(52) U.S. Cl.
CPC ............. *G06N 10/20* (2022.01); *G06N 10/60* (2022.01)

(58) Field of Classification Search
CPC ....... H04L 47/828; G06N 10/20; G06N 10/60
See application file for complete search history.

(56) References Cited

U.S. PATENT DOCUMENTS

2009/0037570 A1* 2/2009 Yu .......................... G01D 21/00
709/224

FOREIGN PATENT DOCUMENTS

CN 108074193 A 5/2018

OTHER PUBLICATIONS

Shaydulin et al., "Network community detection on small quantum computers", May 13, 2019, arXiv:1810.12484v4, pp. 1-26. (Year: 2019).*
Blondel et al., "Fast unfolding of communities in large networks", Jul. 25, 2008, arXiv:0803.0476v2, pp. 1-12. (Year: 2008).*
Lin et al., "Modularity-Based User-Centric Clustering and Resource Allocation for Ultra Dense Networks", Oct. 18, 2018, IEEE Transactions On Vehicular Technology, vol. 67, No. 12, 12457-12461. (Year: 2018).*
International Search Report and Written Opinion dated Feb. 1, 2021 for International Application No. PCT/IN2020/050877 filed Oct. 12, 2020; consisting of 8 pages.
(Continued)

*Primary Examiner* — Brent Johnston Hoover
(74) *Attorney, Agent, or Firm* — Weisberg I.P. Law, P.A.

(57) ABSTRACT

Embodiments described herein relate to a quantum computing device, methods and apparatus for determining a group of interconnected nodes in a network parameter. In an embodiment, a method includes using a quantum computing device to determine initial groups of adjacent nodes based on maximising modularity, and detecting a group of interconnected nodes by grouping the initial groups of adjacent nodes based on maximising modularity.

18 Claims, 3 Drawing Sheets

(56) References Cited

OTHER PUBLICATIONS

H. Ushijima-Mwesigwa et al.; Graph Partitioning using Quantum Annealing on the D-Wave System; PMES'17; Nov. 12-17, 2017, Denver, CO, USA; consisting of 8 pages.
C.F.A. Negre et al.; Detecting multiple communities using quantum annealing on the D-Wave system; PLOS/ONE; Feb. 13, 2020; consisting of 14 pages.
M. Faccin et al.; Community Detection in Quantum Complex Networks; Physical Review X, vol. 4, Oct. 22, 2014, consisting of 16 pages.
V. D. Blondel et al.; Fast unfolding of communities in large networks; Journal of Statistical Mechanics: Theory and Experiment; Jul. 25, 2008; consisting of 12 pages.
M. Girvan et al.; Community structure in social and biological networks; PNAS; Jun. 11, 2022 Vol. 99, No. 12, consisting of 6 pages.
X. Ma et al.; Evolutionary Nonnegative Matrix Factorization Algorithms for Community Detection in Dynamic Networks; IEEE Transactions on Knowledge and Data Engineering, vol. 29, No. 5; May 2017, consisting of 14 pages.
M. Latapy et al.; Computing communities in large networks using random walks; arXiv; Dec. 14, 2004; consisting of 15 pages.
International Preliminary Report on Patentability dated Dec. 27, 2022 for International Application No. PCT/IN2020/050877 filed Oct. 12, 2020, consisting of 59 pages.
B. Cai, et al.; An Improved Random Walk Based Clustering Algorithm for Community Detection in Complex Networks; EEE; 2011; consisting of 6 pages.
Chinese Office Action and English translation dated Jul. 30, 2025 for Chinese Application No. 202080106071.3 consisting of 15 pages.
Faccin, M., et al., Community Detection in Quantum Complex Networks; American Physical Society, Physical Review X 4, 041012 (2014), consisting of 11 pages.
Shaydulin, R., et al., Network community detection on small quantum computers, May 13, 2019, consisting of 26 pages.
European Search Report dated Oct. 23, 2023 for Application No. 20957572.9, consisting of 14 pages.
Sahydulin et al. "Network community detection on small quantum computers;" School of Computing, Clemson University; Oct. 30, 2018, consisting of 26 pages.
Shaydulin et al. "Multistart Methods for Quantum Approximate Optimization;" Cornell University Library; May 23, 2019, consisting of 8 pages.
Naboulsi et al. "On User Mobility in Dynamic Cloud Radio Access Networks;" IEEE INFOCOM 2018—IEEE Conference on Computer Communications; 2018, consisting of 9 pages.
Chinese Notice of Allowance and English translation dated Mar. 20, 2026 for Chinese Application No. 202080106071.3 consisting of 10 pages.
A. Pirker, et al., Modular architectures for quantum networks, New Journal of Physics, The open access journal at the forefront of physics, IOP Publishing, May 24, 2018, consisting of 33 pages.
R. Shaydulin, et al., Multistart Methods for Quantum Approximate Optimization, IEEE, 2019, consisting of 8 pages.
D. Naboulsi, et al., On User Mobility in Dynamic Cloud Radio Access Networks, IEEE Conference on Computers Communications, IEEE INFOCOM 2018, consisting of 9 pages.
L. Lingling, A Dissertation submitted to Xidian University in partial fulfillment of the requirements for the degree of Doctor of Philosophy in Intelligent Information Processing, Sep. 2017, consisting of 123 pages.

* cited by examiner

QUANTUM COMPUTING DEVICE FOR DETECTING GROUPS OF INTERCONNECTED NODES IN A NETWORK

CROSS-REFERENCE TO RELATED APPLICATIONS

This application is a Submission Under 35 U.S.C. § 371 for U.S. National Stage Patent Application of International Application Number: PCT/IN2020/050877, filed Oct. 12, 2020 entitled "QUANTUM COMPUTING DEVICE FOR DETECTING GROUPS OF INTERCONNECTED NODES IN A NETWORK," the entirety of which is incorporated herein by reference.

TECHNICAL FIELD

Examples of the present disclosure relate to a quantum computing device which may be used for detecting a group of interconnected nodes or communities in a network. Network resource allocation may be based on this detection.

BACKGROUND

Fifth generation (5G) telecommunications networks as specified by the Third Generation Partnership Project (3GPP) are evolving to empower new services and use cases for users including people and machines or autonomous or semi-autonomous devices enabling the Internet of Things (IoT). 5G provides unprecedented speed and flexibility, and carries more data with greater responsiveness and reliability than ever before. 5G uses cases include massive Machine type communications (mMTC) as well as enhanced mobile broadband (eMBB).

One of the major issues of today's increasingly complex and extensive networks is determining patterns or structures of interconnected nodes or communities. That is, discovering groups, modules or communities of nodes that interconnect with each other so that network resources and services can be optimally configured. Examples of such groups or communities include Industrial IoT, power grids and Healthcare networks. The number of communities at 5G edge may become very large and so it is useful to detect communities automatically and include nodes or network service subscribers in the correct community.

Known approaches to detecting communities of nodes include the "fast unfolding algorithm" and "quantum walk" solutions which utilize modularity as an optimizing parameter. For a given undirected Graph G=(V,E) describing a network or nodes, a community or group of interconnecting nodes is a set $X=\{A_i \subseteq V | \cup A_i = V, A_i \cap A_j = \varphi, \forall i,j\}$ i,j:1 to |X|.

Modularity M is a function defined from the set of all communities to 0 to R, with which to compare different communities. This function can be used to analyze the inter-community and intra-community connectedness of a community and can be used to detect communities with the highest modularity. It is a measure of the strength of division of a network into modules, with networks having high modularity having dense clusters of connections between nodes in modules and sparse connections between nodes in different modules or communities. A commonly used modularity function is given by $$M = \frac{1}{2m} tr(C^T BC)$$

where $C_{ij}$(Community Matrix) =

1 if node $i$ is assigned community $C_j$, $= 0$ otherwise, $$B_{i,j} = A_{ij} - \frac{d_i d_j}{m},$$

$m$ = sum of degrees, $d_i$ = degree of node $i$

The "fast unfolding algorithm" is described in Vincent D Blondel, Jean-Loup Guillaume, Renaud Lambiotte, and Etienne Lefebvre. Fast unfolding of communities in large networks. *Journal of Statistical Mechanics: Theory and Experiment,* 2008(10):P10008, October 2008. This algorithm takes as input a Graph G with N nodes and initializes different communities to each ode such that every node is placed in a community ci. The algorithm then performs the following two steps until there is no further increase in modularity:

Step 1: for i from 1 to N:
  for j in Neighbours(i)
    Compute the gain in modularity, ΔM if i is removed from $C_i$ and placed in $C_j$.
  Node i is placed in community with the highest ΔM, if that value is positive. If no positive gain is possible, i stays in its community.
Step 1 is carried out until no improvement in modularity can be achieved.
Step 2: A new network is built whose nodes are the communities found during step 1. The weights of link between these new nodes are the sum of weights of nodes between the communities.

This method has proved to be effective and the modularity values of the resulting communities are found to be very good. But as the size of the network increases, this method becomes more and more intractable, due to both space complexity and time complexity issues.

The "quantum walk" is described in Mauro Faccin, Piotr Migdal, Tomi H. Johnson, Ville Bergholm, and Jacob D. Biamonte. Community detection in quantum complex networks. *Phys, Rev. X,* 4:041012, October 2014. This is a classical algorithm which uses the concept of quantum walks to define a closeness function C which is defined from X×X to R, such that C(S,T)=C(T,S) and C(S∪T,R)≤max[C(S,R),C(T,R)]. This algorithm also takes as input Graph G with N nodes and initializes a set of communities K, with each node/being assigned a separate community $c_i$. The algorithm then performs the following procedure:

Do till [K]=1
  ∀A,B∈K×K
Compute C(A,B).

where communities A, B for which C is maximum, are merged. This closeness function can be used to build a dendogram, through agglomerative clustering, starting with every node being in different communities and ending with every node in the same community. At each level, the modularity is computed so that the community with the best modularity can be determined.

This algorithm works well to discover new communities in the procedure although it computationally expensive and may be difficult to scale to large networks.

SUMMARY

It is an object of the present disclosure to provide improved methods and apparatus for detecting groups of communicating nodes in a network.

In one aspect there is provide a method of using a quantum computing device to detect a group of interconnected nodes in a network. The method comprises determining initial groups of adjacent nodes based on maximising modularity using the quantum computing device. A group of interconnected nodes are detected by grouping the determined initial groups of adjacent nodes based on maximising modularity.

This allows groups of interconnected network nodes to be readily and rapidly detected, allowing a more scalable method of analysing large and complex networks. For example, groups of interconnecting nodes may be detected in a telecommunications network and automatically allocated network resources add resilience where appropriate and reduce undesirable loading effects such as latency and connection loss.

In an embodiment detecting a group of interconnecting nodes comprising grouping the determined initial groups of adjacent nodes where modularity is increased. The determined initial groups of nodes may be iteratively grouped until modularity no longer increases.

In an embodiment the quantum computing device comprises a quantum circuit having one or more oracles coupled to registers associated with nodes of the network and initial groups of adjacent nodes for each node.

In another aspect there is provided an apparatus for detecting a group of interconnected nodes in a network. The apparatus comprises a processor and memory containing instructions executable by the processor whereby the apparatus is operable to determine initial groups of adjacent nodes based on maximising modularity using a quantum computing device. The processor is also operable to detect a group of interconnected nodes by grouping the determined initial groups of adjacent nodes based on maximising modularity.

According to certain embodiments described herein there is also provided a computer program comprising instructions which, when executed on a processor, cause the processor to carry out methods described herein.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Embodiments relate to network analysis and configuration of network resources using modularity to detect groups of interconnected network nodes. Determining such groups can be used for a number of purposes including allocating additional network resources within groups to ensure sufficient capacity. Known methods of detecting groups of network nodes do not scale well as the number of nodes increases and therefore may not be capable of effectively analyzing and optimally configuring emerging 5G networks.

Figure 1:
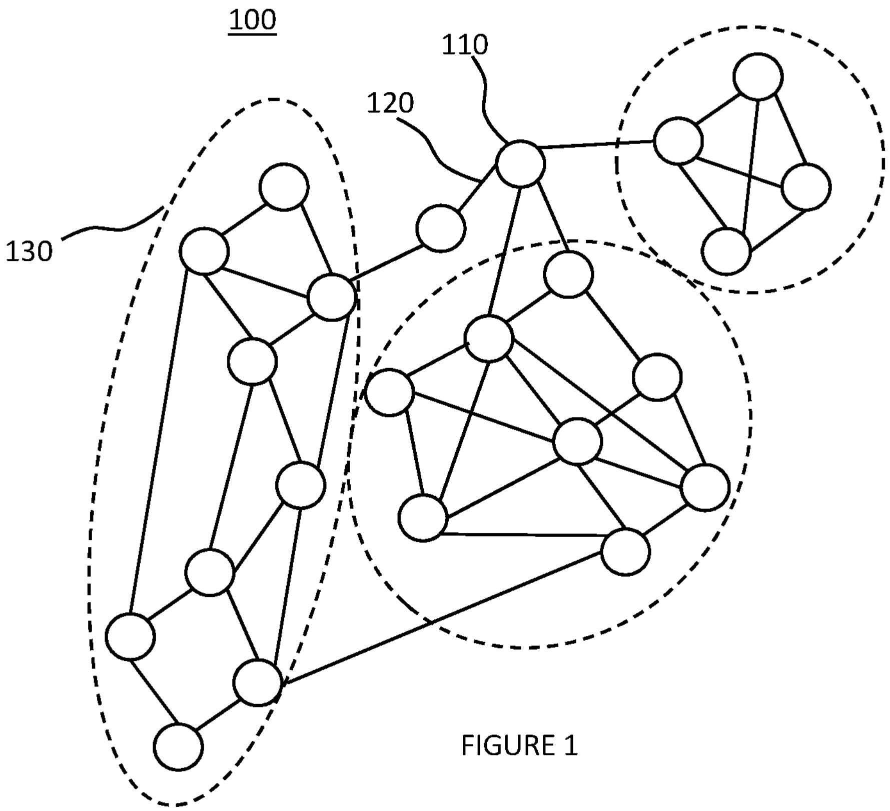
FIG. 1 shows an example of a network having groups of interconnected nodes.

FIG. 1 illustrates a communications network 100 such as a 5G network having a number of nodes 110. The nodes 110 have connections or links 120 to other adjacent nodes. Groups of interconnected nodes 130 can be detected which have a high density of connections between the nodes of the group 130 but relatively few connections 120 to other groups 130. Detecting these groups within a communications network allows certain configurations or parameters of the network 100 to be optimized. For example, the connections between groups of nodes 130 may be made more robust by adding redundancy as there are fewer connection routes between nodes of different groups compared with nodes within groups.

Quantum computers (QCs) promise a new form of computing that is qualitatively different from previous "classical" forms of computation. While QCs are technically more difficult to build, and the best current general-purpose quantum computers have only 50-100 qubits, they can solve some problems with a time that grows more slowly as a function of the input size, and therefore are suitable for analyzing large networks where the computational expense and/or time required by classical computing may be prohibitive.

In this specification, the term quantum computing devices may include quantum circuits which are models for quantum computing which are executed on classical computing devices to simulate quantum algorithms implied by the quantum circuit.

The term "qubit" refers to a quantum two-level system, such as the spin of a spin-½ particle. Qubits can be thought of as a generalization of classical bits (cbits) in that cbits can be in states 0 or 1, while the state of a single qubit is described by complex numbers $\alpha_x$ and $\beta_x$ fix satisfying $|\alpha_x^2|+|\beta_x^2=1$. A qubit is a state in a complex vector space of dimension 2. In the standard basis, it can be represented as $|\varphi\rangle=\alpha_x|0\rangle+\beta_x|1\rangle$, with $|\alpha_x^2|+|\beta_2^2|=1$. If $\alpha_x=0$ or $\beta_x=0$, then the bit is equivalent to a classical bit. Otherwise, the qubit is said to be in a superposition of $|0\rangle$ and $|1\rangle$.

A register is a composite system of qubits in which a system with n qubits is defined in a complex vector space of dimension $2^n$. This is given by the tensor product of n complex vector spaces of dimension 2.

A finite-dimensional Hilbert space H is a finite dimensional vector space with an inner product defined. A state, in quantum computing and quantum information, is defined as a positive semi-definite matrix ρ with tr(ρ)=1. A pure state is a rank 1 state, in which case, one can express it as it's eigenvector $|\varphi\rangle \in H$, such that $\langle\varphi|\varphi\rangle=1$. A mixed state is a state with rank >1, in which case one can express it using spectral decomposition as a convex sum of pure states. The matrix notation of a state is called the density matrix.

A qubit changes its state by going through one or more unitary transformations. A unitary matrix or gate is a matrix $U \in B(H)$, where B(H) is the set of all matrices over H, such that $UU^*=U^*U=I$. An example is the Hadamard gate which is described by unitary matrix H=

$$\frac{1}{\sqrt{2}}\begin{pmatrix} 1 & 1 \\ 1 & -1 \end{pmatrix}$$

Measurement corresponds to transforming the quantum information stored in a quantum system into classical information, so that for example one of the $2^n$ values in a register of n qubits is output—for example a register having 20 qubits has 4,294,967,296 available values and measurement will output one of these. A measurement is defined by a set of measurement operators, $M=\{M_i\}$ such that $$\Sigma_i M^*_i M_i = I.$$

During measurement, the probability of seeing the outcome i is $$P(i)=\langle\varphi|M^*_i M_i|\varphi\rangle$$

and the post measurement state is given by $$\frac{M_i|\phi\rangle}{\sqrt{\langle\phi|M_i^* M_i|\phi\rangle}}$$

For a density matrix ρ, the probability of seeing the outcome i is $$P(i)=tr(M^*_i M_i \rho)$$

and the post measurement state is given by $$\frac{M_i \rho M_i^*}{tr(M_i^* M_i \rho)}$$

The power of quantum computers comes from scaling. A system of n classical bits (cbits) can be in 2n different states while the state of n qubits is described by a complex unit vector of length $2^n$. These vectors (also called wavevectors or wavefunctions) can be transformed by multiplying them by unitary matrices. For example, the wavevector can be Fourier transformed using $O(n^2)$ elementary quantum gates. However, not all transformations can be done efficiently. The laws of quantum measurement also limit the amount of information that can be extracted from a quantum state. A full measurement of the state yields outcome x with probability $|\alpha_x|^2$ destroying the state in the process. Thus, even though describing the quantum state of n qubits requires an amount of information that scales exponentially with n, measurement can only extract n bits of information. Finding a way to benefit from the exponential state space of quantum computers despite this and other limitations is the central challenge of writing new quantum algorithms.

An embodiment uses a hybrid system of quantum and classical computing to detect groups of interconnected nodes. In order to implement the quantum computing device or quantum circuit, the problem of detecting groups of interconnected network nodes needs to be appropriately defined as described in more detail below. This can be implemented using quantum oracles taking graphs as input in order to find initial groups of adjacent nodes by maximizing modularity. The classical computing part of the embodiment may then iterate through various combinations or groupings of nodes, starting with the initial groups of adjacent nodes, until no further improvement in modularity results. The resulting groups of interconnected nodes can then be used as a basis for configurating various network settings.

Figure 2:
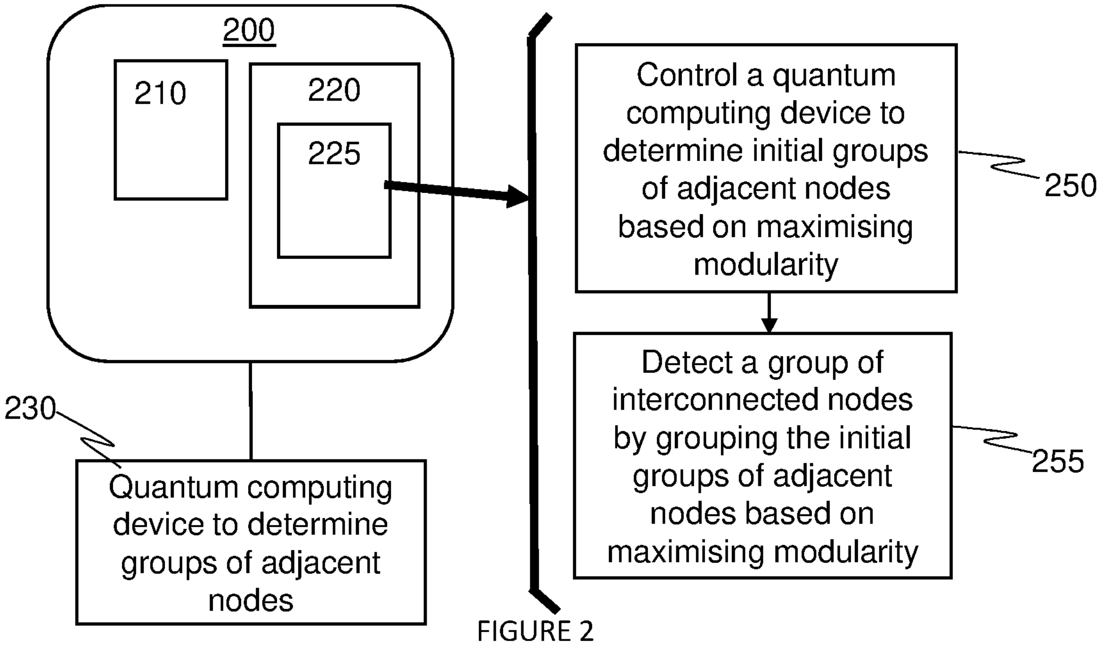
FIG. 2 shows an apparatus for detecting groups of interconnected node nodes.

FIG. 2 illustrates an apparatus according to an embodiment, for detecting groups of interconnected network nodes. The apparatus includes a classical computer 200 and a quantum computing device 230. The classical computer 200 may be arranged to control operation of the quantum computing device 230 and/or to receive and further process measurement outputs from the quantum computing device 230. The computer 200 may be configured in a cloud environment communicable with the quantum computing device 230 or it may be integrated with the same in close physical proximity. In an alternative arrangement, the computer may simulate the quantum computing device 230 using a quantum circuit for example.

The apparatus 200 comprises processing circuitry 210 (e.g, a processor) and a memory 220 in communication with the processing circuitry 210. The memory 220 contains instructions 225 which when executed by the processor 210 cause the processor to carry out methods of the embodiments. The memory 220 may also be used to store values and/or measurements. An example method is illustrated which may be performed by the apparatus 200 to detect groups of interconnected nodes in a network.

At 250, the method controls the quantum computing device 230 to determine initial groups of adjacent nodes based on maximizing modularity. The quantum computing device comprises a quantum circuit which is run a number of times to determine these initial groups which may be stored in the memory 220. The number of runs is significantly reduced compared with applying a classical computing approach to this step. An example quantum circuit is described in more detail below.

At 255, the computer 200 uses these initial groups of adjacent nodes to detect one or more groups of interconnected nodes based on maximizing modularity. This may be implemented by combining the initial groups of adjacent nodes until combined groups are found when no further combining will increase modularity. For example, pairs of initial groups of adjacent nodes may be combined and those where modularity are increased are used combined with other groups of initial or paired groups of adjacent nodes. This process of combining larger and larger groups of nodes continues until the combined groups have a maximum modularity—in other words they can not be combined with any other groups of nodes in order to increase modularity. An example algorithm is described in more detail below.

A communications network may be modeled as an undirected unweighted graph G, which is a mathematical structure used to model pairwise relations between nodes. The graph defined vertices V (network nodes) and edges E (connections between adjacent nodes) and may be described in matrix format. The adjacency matrix A of the graph G or network is determined by indicating, in a square matrix of the vertices V, which pairs of vertices are adjacent or connected by edges E.

A graph of network nodes G=(V,E), |V|=N can be partitioned in r initial groups or communities. Let $X=\{P_j\}$, where initially each group has only one node. A function T such that $T_x(P_i,P_j)$ can be used to represent the difference in modularity before and after merging the communities $P_i$ and $P_j$ into a single community (where i≠j). That is, where $X=\{P_1,P_2, \ldots, P_r\}$ then $X'=(X/\{P_i,P_j\})\cup(\{P_i\cup P_j\})$ where X' is the combination of groups $P_i$ and $P_j$. Then $T_x(P_i,P_j)=M(X')-M(X)$.

Using the previously noted modularity function M, where $$M = \frac{1}{2m} tr\left(C^T BC\right),$$

matrix B is $$B_{ij} = A_{ij} - \frac{d_i d_j}{m},$$

where A is the adjacency matrix, $d_i$ is the degree of node i and m is the sum of degrees. Letting C be the community matrix associated with X and C[k] be the kth column of C, which denotes the community $P_k$. Then, $$M(X) = \frac{1}{2m} tr\left(C^T BC\right) = \frac{1}{2m} \sum_{k=1}^{r} C[k]^T BC[k]$$

X' corresponds to merged communities or combined groups $P_i$ and $P_j$. Then C' is the community matrix associated with X'. Let Y be the set of columns of C and Y' be the set of columns of C'. It can be seen that $Y'=(Y/\{C[i],C[j]\})\cup(\{C[i]+C[j]\})$ Letting $C'[k_0]$ be the only column in Y'/Y, then $C'[k_0]=C[i]+C[j]$. It follows that:

$$\begin{aligned} T_X(P_i, P_J) &= \frac{1}{2m}(M(X') - M(X)) \\ &= \frac{1}{2m}\left(C'[k_0]^T BC'[k_0] - C[i]^T BC[i] - C[j]^T BC[j]\right) \\ &= \frac{1}{2m}\left((C[i] + C[j])^T B(C[i] + C[j]) - \right. \\ &\qquad \left. C[i]^T BC[i] - C[j]^T BC[j]\right) \\ &= \frac{1}{2m}\left(C[i]^T BC[j] + C[j]^T BC[i]\right) \\ &= \frac{1}{m}\left(C[i]^T BC[j]\right) \end{aligned}$$

(Since B is a real symmetric matrix)

It can be seen that $T_x(P_i,P_j)=T_x(P_j,P_i)$

Letting $I=\{I|C[i]_I=1\}$ and $J=\{I|C[j]_I=1\}$, where $C[i]_I, C[j]_I$ are the $I^{th}$ coordinates of C[i],C[j]. I∩J=φ as one node cannot be part of two communities in a pair-wise disjoint partitioning. Then $T_x(P_i,P_j)=$ $$\frac{1}{m} \sum_{l_0 \in I, l_1 \in j} B_{l_0 l_1}$$

Initially, every node is considered to be in a separate community or group. That means, the partitioning into communities is given as $X=\{P_i\}$ where $P_i=\{I\}$, i∈V.

Then, we want to find groups of adjacent nodes by maximising modularity. This can be determined using $$G(i)=\text{argmax}_{j\neq i} T_x(P_i,P_j)$$

for each node i. For every community $P_i$, $P_{G(i)}$ is the community with the highest gain in modularity when grouped or merged with $P_i$. Letting $j^0=\text{argmax}_j T_x(P_{G(j)},P_j)$ then merging or combining $P_{G(j}0_)$ and $P_j0$ increases the modularity the most.

From then on, after performing a merge, at each step, we determine the next merge that increases the modularity the most. For each community, except for the newly created one, we know which other community is the one giving the highest modularity while merging.

At some point, let there be r communities or groups of the network. That is, $X=\{P_j\}$, such that total number of non-empty elements in X is r. $P_j^0$s need not be singletons. For every community $P_j$, consider $P_{G(j)}$ to be the community that increases the modularity most after merging.

Then let $H(j)=T_x(P_{G(j)}, P_j)$, where H represents the best possible gain in modularity that can be achieved by merging $P_j$ with any community. Let $P_k$ be the community formed after the next merge and let the new partitioning be $X^0$, that is, $P_k=P_i\cup P_j$. Consider $i_0\neq i$ and $j_0\neq j$. Looking to determine what the change in modularity would be if $P_{i0}$ and $P_{j0}$ are merged before and after merging $P_i$ and $P_j$, let C and C' be the community matrix before and after merging. Before merging $P_i$ and $P_j$.

$$T_X\left(P_{i_0}, P_{j_0}\right) = \frac{1}{m}\left(C[i_o]^T BC[j_o]\right)$$

After merging $P_i$ and $P_j$, $$T_{X'}\left(P_{i_0}, P_{j_0}\right) = \frac{1}{m}\left(C'[i_o]^T BC'[j_o]\right).$$

But $C'[i_0]=C[i_0]$ and $C'[j_0]=C[j_0]$, which means that at any step, to figure out the next best merge, for each community, we can compute the change in modularity's of that community with the newly formed community. That is, for every community $P_I$, $$H(I):=T(P_k,P_I) \text{ if } T(P_k,P_I)\geq H(I)$$

This means that the whole maximum finding process is not required given that the information of H(I)'s of the previous step is available.

An algorithm based on the above derivation is shown below:

Input: Graph G=(V,E), |V|=N and it's adjacency matrix A.

Output: Community partitioning of the graph

Step 1: Initialize $X=\{P_i\}$ where $P_i=\{i\}$ and H(i)=0 for all i

Step 2: For each i, do:

$G(i)=\text{argmax}_{j\neq i} T_x(P_i,P_j)$ $H(i)=T_x(P_{G(j)},P_i)$

Step 3: Let $j_0=\text{argmax}_i T(P_{G(j)},P_i)$. Set $P_{j0}=P_{J0}\cup P_{G(j0)}$, then $P_{G(j0)}=\varphi$ and $H(G(j_o))=0$ Step 4: Do until $H(i)\leq 0 \forall i$ For each i, with $P_i \neq \varphi$, set $G(i)=j_0$ and $H(i)=T(P_i,P_{j0})$ if $H(i)\leq T_x(P_i,P_{j0})$ $j_0=\text{argmax}_i(H(i))$ Set $Pj0=Pj0 \cup P_{G(j0)}$, then $P_{G(j0)}=\varphi$ and $H(G(j0))=0$ if for any i, with $P_i \neq \varphi$, $G(i)=G(j_0)$, then $G(i)=j_0$ and $H(i)=T_x(P_i,P_{j0})$ Step 5: Return $P_i$'s Step 2 of the above algorithm determines initial groups of adjacent nodes based on maximizing modularity. Each node is initially allocated to its own group or community and is then combined with an adjacent node to form a new combined group or community where this results in a higher modularity. If this merging or grouping would not result in higher modularity then the adjacent node is retained in its own community or group. When merged, the new group is then again combined or merged with an adjacent node if this results in higher modularity. This iterative process continues until an initial group of adjacent nodes is determined for each node. This process can be computationally expensive especially as the number of operations required increases quadratically with increasing nodes in the network.

In an embodiment a quantum circuit can be designed to implement the above algorithm using a quantum computing device. The initial groups of adjacent nodes having highest modularity can then be found in O(✓N) operations instead of O(N) operations.

Considering the undirected unweighted graph G=(V, E) and initially having every node in its own separate community. Then partitioning into communities is given as $$X=\{P_i\} \text{ where } P_i=\{i\}, i\in V.$$

Let N=|V| and assume for simplicity $N=2^n$ for some integer n. If not, extra nodes can be connected with no other edge E to make this an exponent of 2. Each community is denoted by a basis vector $|i\rangle$. Now consider an oracle:

$$f(|i,j\rangle,|l,m\rangle) \begin{matrix} =1 & \text{if } T_X(|i,j\rangle) \geq T_X(|l,m\rangle) \\ =0 & \text{otherwise} \end{matrix}$$

The aim is to determine, for every community $|i\rangle$, the community $|j\rangle$ that when merged would increase the modularity the most. This is equivalent to determining $$\text{argmax}_{j\neq i} T_x(|i,j\rangle)\forall i.$$

The maximum can be determined using the Durr Hoyer algorithm. This has been described for example in the above noted Mauro Faccin, Piotr Migdal, Tomi H. Johnson, Ville Bergholm, and Jacob D. Biamonte. Community detection in quantum complex networks. *Phys. Rev. X*, 4:041012, October 2014. However, in an embodiment this can be found using the oracle f in which the algorithm is:

For each i, do

Initialize $y=y_0$ randomly from $0\leq y\leq N-1$.

Repeat the below steps $0\sqrt{N}$ times initialize the state $$|\psi\rangle = \frac{1}{\sqrt{N}} \sum_j^N \Big| [i, j\rangle |i, y_0\rangle \Big\rangle$$

Apply Grover search with the oracle f.

Observe the first register. If $|i,j_0\rangle$ is your outcome and if $T(|i,j_0\rangle) \geq T(|i,y_0\rangle)$, then set $y_0=j_0$ Return $y_0$ Set $G(i)=y_0$ In an example two oracles can be used:

$$A: |i,j,z\rangle \rightarrow |i,j,z+A[i,j]\rangle$$

$$D: |i,j,z\rangle \rightarrow |i,j,z-D[i,j]\rangle$$

Here, D is a matrix with it's entries given as $$D_{ij} = \frac{d_i d_j}{m}.$$

A modified modularity function M' is given by $M'(X)=\text{tr}(C^T(A-D)C)$ as this works in the same way as the previous modularity function for different partitions in the same graph. In comparing the modularity's of different community partitioning's of the same graph, we can use this as the modularity function used is same for any partitioning X.

Using M', a modified modularity change function $T'_x(P_i, P_j)=M'(X')-M'(X)$. $T'_x(P_i,P_J)=_{|0\in|,|1\in,J}(A_{|0||}-D_{|0||})$. In step 2, every node is a community and thus every community is a singleton set. That means the operator AD: $|i,j,z\rangle \rightarrow |i,j,z+A[i,j]-D[i,j]\rangle$ can be used for $T'|i,j\rangle$ Using the unitary operator $$U|i\rangle|j\rangle|0\rangle = \begin{matrix} |i\rangle|j\rangle|1\rangle & \text{if } i \geq j \\ |i\rangle|j\rangle|0\rangle & \text{otherwise} \end{matrix}$$

AD combined with U and a Z gate is the oracle f.

Using 7 registers, the oracle f can be achieved as per below.

$$|\varphi_0\rangle = |i\rangle|j\rangle|0\rangle|k\rangle|l\rangle|0\rangle|0\rangle$$

$$|\varphi_1\rangle = A\otimes A\otimes l|\varphi_0\rangle$$

$$= |i\rangle|j\rangle|A_{ij}\rangle|k\rangle|l\rangle|A_{kl}\rangle|0\rangle$$

$$|\varphi_2\rangle = D\otimes D\otimes l|\varphi_1\rangle$$

$$= |i\rangle|j\rangle|A_{ij}-D_{ij}\rangle|k\rangle|l\rangle|A_{ki}-D_{ki}\rangle|0\rangle$$

$$|\varphi 3\rangle = U_{367}Z_7|\varphi 2\rangle$$

$$\begin{matrix} = -|i\rangle|j\rangle|A_{ij}-D_{ij}\rangle|k\rangle|l\rangle|A_{kl}-D_{kl}\rangle|1\rangle & \text{if } A_{ij}-D_{ij} \geq A_{kl}-D_{kl} \\ = |i\rangle|j\rangle|A_{ij}-D_{ij}\rangle|k\rangle|l\rangle|A_{kl}-D_{kl}\rangle|0\rangle & \text{otherwise} \end{matrix}$$

Here, $U_{367}$ is the U gate applied to registers 3, 6, and 7, and $Z_7$ is a Z gate applied to register 7. On the space complexity side, we require d qubits to store the value in register 3 or register 6. Then we would require 4n+2d+1 qubits to run the circuit. The circuit is run $O(^{N1.5})$ times to determine the initial groups of adjacent nodes. This corresponds to step 2 noted above, and once the runs are completed the rest of the algorithm can be executed using a classical computing device. However, for these subsequent steps, the embodiment uses functions M' and T' instead of M and T.

Let $$|v\rangle = \frac{1}{\sqrt{N}} \sum_{j=0}^{N-1} \Big|j\Big\rangle.$$

Define $V=2|v\rangle\langle v|-I=H^{\beta n}(2|0\rangle\langle 0|-I)H^{\beta n}$. Then the final quantum circuit implementing the above is illustrated in FIG. 3.

Figure 3:
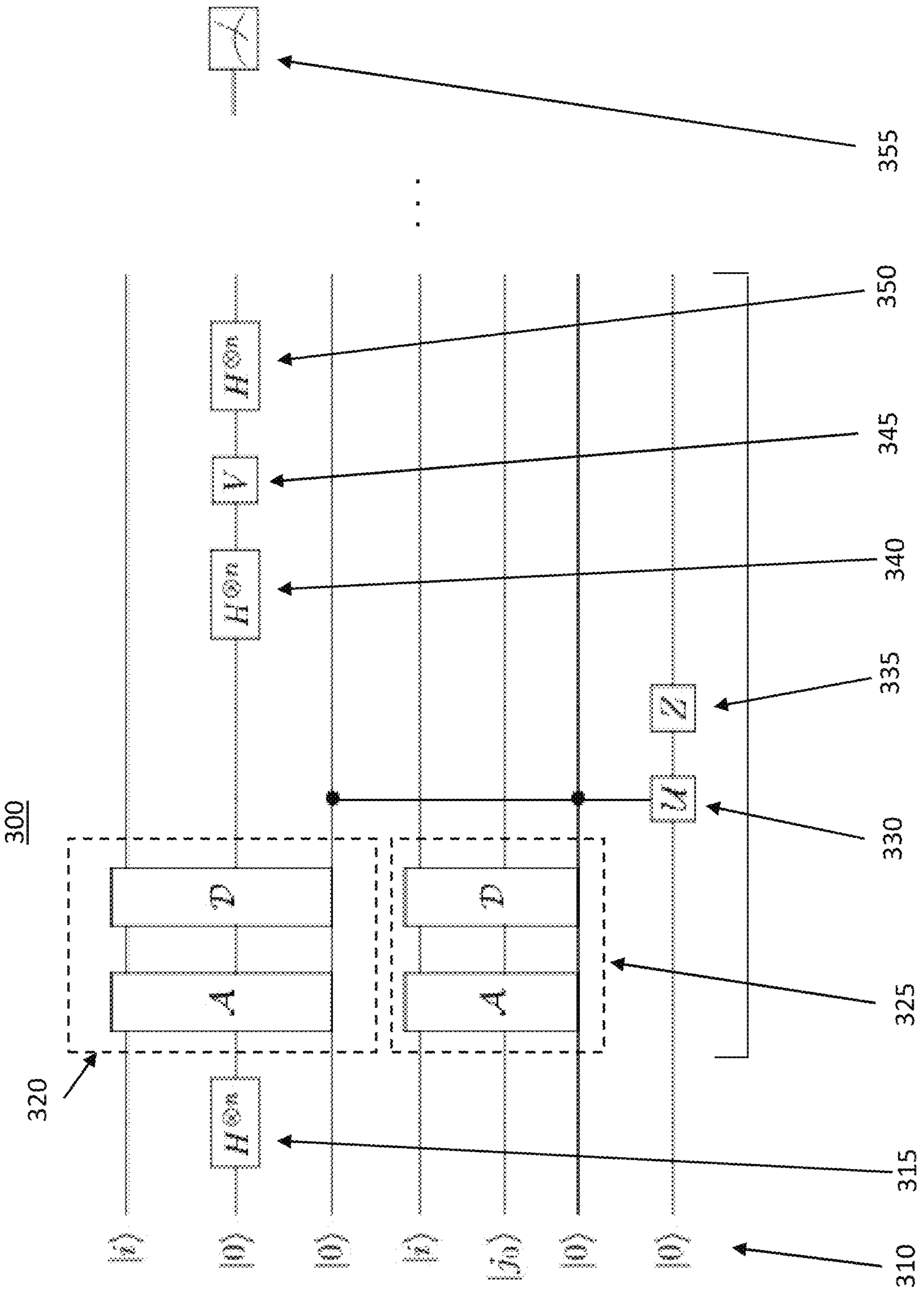
FIG. 3 shows a quantum circuit for determining groups of adjacent network nodes which maximise modularity.

FIG. 3 illustrates a quantum circuit according to an embodiment. The quantum circuit may be implemented in a quantum computing device and controlled and measured using a classical computing device to form a hybrid computing system. The quantum computing device may be implemented as a quantum computer manipulating subatomic particles or it may be implemented as a quantum algorithm simulated on a classical computing device.

The quantum circuit 300 comprises seven registers 310 (numbered in descending order) containing a number of qubits depending on the number of nodes. A classical computing device initializes the registers as described above. Registers 1,2 3 have superposition of all communities and registers 4, 5, 6 contain the community for which we are trying to find the best community for grouping or merging. Register 7 is used for implementing the oracle(s). The qubits of the second register are put into superposition using a Hadamard gate 315. Registers 1, 2 and 3 are input to a first AD oracle 320 and registers 4, 5 and 6 are input into a second AD register 325. The seventh register is an ancillary register having the unitary gate 330 which is based on the output of the oracles from registers 3 and 6. The unitary gate 330 is coupled to a Z gate 335. The output of the oracle 320 from the second register is coupled to another Hadamard gate 340, a V gate 345 (see V defined above) and a further Hadamard gate 350. This combination of gates provides a reflection about the equal superposition state. Finally, a measurement gate 355 measures the output from the circuit for each run.

Once the quantum circuit 300 has been run a predetermined number of times, the values from the measurement gate 350 may be analyzed, for example to detect groups of interconnected nodes based on maximizing modularity. The quantum circuit 300 has community or node inputs with an output that is the best grouped or merged community. The best merged community for each node can then best used as the starting point for the classical algorithm to detect groups of interconnected nodes based on maximizing modularity.

In terms of complexity, in the worst case, the number of steps required to calculate $T_x(P_i,P_j)$ could be $$\frac{N^2}{2}$$

if N is even and $$\frac{N(N+2)}{4}$$

if N is odd. In step 2 above, the function T is computed $NC_2$ times, that is, $O(N^2)$. Then, in every iteration, Tis computed O(N) times, and in the worst case, N−1 merges would be needed.

Using the above quantum circuit to carry out step 2, T is computed $O(N^{1.5})$ times, Throughout Step 2, the complexity of computing $T_x$ is constant.

By way of comparison, in the fast unfolding algorithm, step 1 requires O(m) steps, where m is the number of edges in the network. This is carried out until no improvement in modularity is obtained, then an unfolding process is carried out and step 1 is carried out again. This could potentially be intractable on certain very large and dense datasets. The algorithm of the embodiment is influenced less by the number of edges and with the proposed quantum speedup, could be used for large, dense networks.

The embodiment was simulated on two popular data sets used to measure the quality of community detection algorithms; (1) the Zachary karate club data set and (2) American college football data set.

Zachary's karate club is a social network of a university karate club, described in the paper "An Information Flow Model for Conflict and Fission in Small Groups" by Wayne W. Zachary. The network has become a popular example of community structure in networks.

| Dataset | Zachary karate club | America football |
|---|---|---|
| No. of nodes | 34 | 115 |
| No. of edges | 78 | 613 |
| Modularity score | 0.3784 | 0.5152 |
| No. of communities detected | 3 | 5 |

The communities picked out for Karate Club data set were:

| Community | Nodes |
|---|---|
| 1 | 12, 17, 6, 7, 1, 5, 11 |
| 2 | 19, 30, 27, 34, 24, 28, 29, 32, 26, 25, 21, 23, 33, 31, 9, 15, 16 |
| 3 | 20, 22, 2, 18, 14, 13, 4, 8, 10, 3 |

The communities picked out for American college football data set were:

| Community | Nodes |
|---|---|
| 1 | 43, 38, 71, 31, 99, 85, 14, 54, 18, 34, 61, 12, 26 |
| 2 | 67, 104, 41, 23, 111, 78, 90, 28, 50, 11, 24, 69, 8, 51, 68, 108, 77, 21, 22, 7, 4, 9, 93, 16, 1, 114, 73, 46, 49, 110, 53, 88, 83, 84, 74, 52, 98, 107, 10, 102, 72, 40, 81, 5, 3, 2 |
| 3 | 82, 101, 94, 80, 109, 105, 33, 103, 25, 37, 45, 89, 79, 19, 29, 30, 55, 35 |
| 4 | 100, 106, 32, 13, 39, 15, 60, 47, 64, 6 |
| 5 | 113, 96, 76, 92, 75, 66, 112, 63, 42, 97, 59, 58, 36, 57, 86, 44, 48, 91, 20, 65, 17, 87, 56, 27, 95, 62, 70 |

To run step 2 of the proposed algorithm using quantum computing, the Karate Club data set requires 25+2d qubits and the American football data set requires 29+2d qubits, where d depends on the number of decimals to store the real values from the oracle's output.

Figure 4:
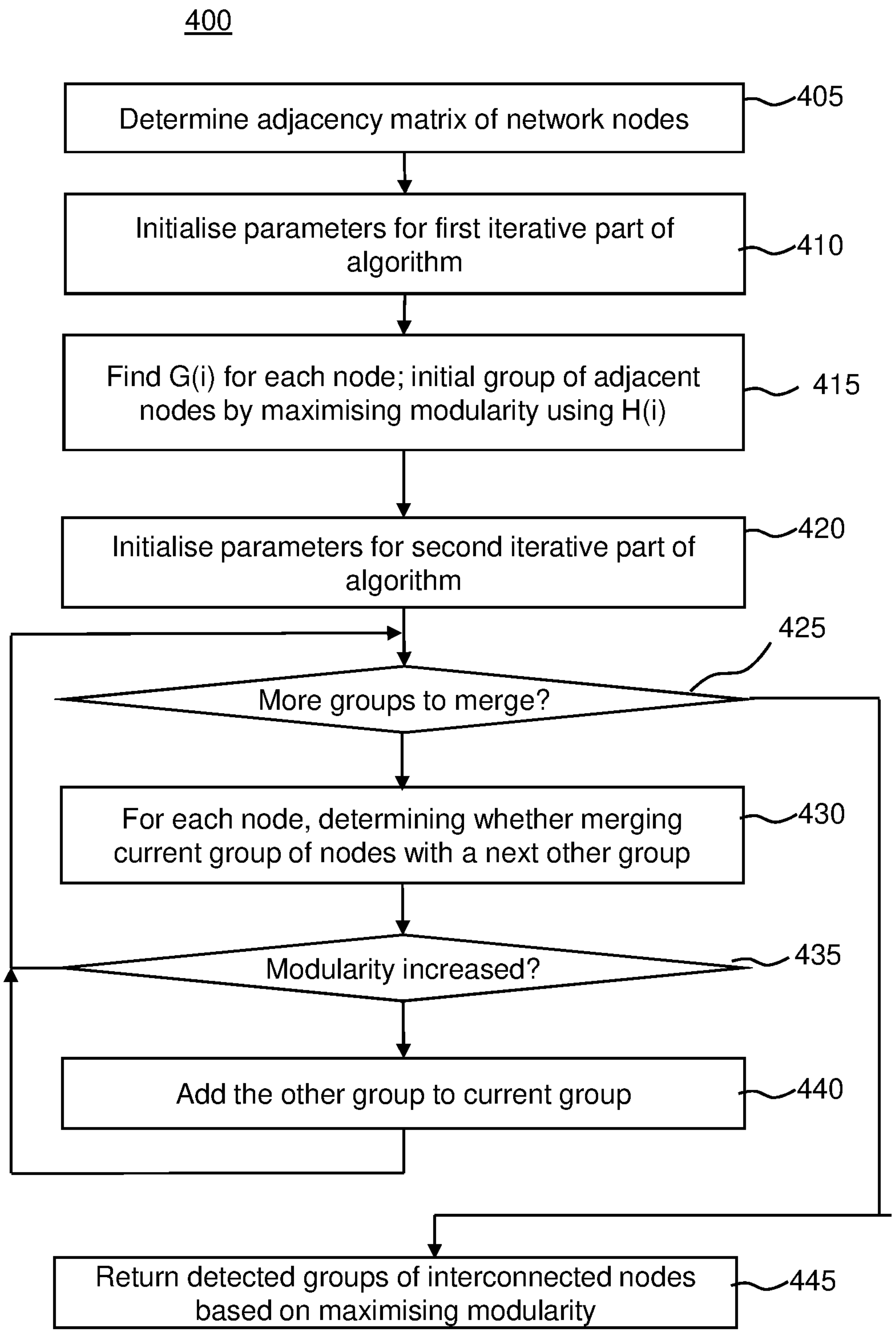
FIG. 4 is a flow chart of an example of a method of detecting groups of interconnected network nodes using increases in modularity.

FIG. 4 illustrates a method 400 of detecting groups of interconnecting nodes in a network based on modularity. The method may be performed by a combination of classical and quantum computing devices, for example the system of FIG. 2 and the network of FIG. 1, although it could be implemented in a classical computer and/or using different types of networks.

At step 405, the method 400 determines an adjacency matrix of the network 100. The adjacency matrix $A=[a_{ij}]=1$ if node i is connected to node j, else 0. Any suitable method for determining the adjacency matrix of a network of nodes can be used.

The method 400 utilizes two iterative loops to determine initial groups of adjacent nodes and to detect groups of interconnecting nodes respectively, both based on maximizing a modularity function such as M previously described.

At step 410, the is parameters for the initial iterative loop are initialized. Here, $X=\{P_i\}$ where $P_i=\{i\}$ and $H(i)=0$ for all i, where i is the node index.

At step 415, the method 400 determines initial groups of adjacent nodes for each node adding adjacent nodes to the group where the increase in modularity is positive. For example, starting with node x in its own group of one, the iterative loop forms a larger group including adjacent nodes if the modularity increases by doing so. Then the loop forms a larger group including nodes adjacent to the merged group if this increases modularity, and so on until modularity no longer increases. At this point the initial group of adjacent nodes for node x is determined and the iterative loop moves onto the other starting nodes to determine an initial group of adjacent nodes for each of them. This can be expressed as finding $G(i)=\mathrm{argmax}_{j\neq i}T_x(P_i,P_j)$ for each node using the function $H(i)=T_x(P_{G(i)},P_i)$ to determine whether there has been an increase in modularity at each merging as described above.

Step 415 can be implemented using a quantum circuit such as that described with respective to FIG. 3. This may be implemented using quantum oracles as previously described, although alternative implementations may use Hamiltonian simulations to determine other suitable quantum circuits.

Once the initial groups of adjacent nodes are found for each node in the network, the method 400 moves onto step 420 which initializes parameters for the second iterative loop. This set sets $j_0=\mathrm{argmax}_i T(P_{G(i)},P_i)$, $P_{j0}=P_{j0}\cup P_{G(j0)}$, and $P_{G(j0)}=\varphi$ and $H(G(j_0))=0$.

At step 425, the method 400 determines whether there is a next initial group of adjacent nodes to merge and if so proceeds to step 430. Otherwise once all initial groups have been processed by the second loop below, the method moves to step 445.

At step 430, the method 400 detects groups of interconnected nodes by merging initial groups of adjacent nodes and resulting merged groups of nodes until modularity no longer increases. For example, starting with the initial group of adjacent nodes determined for node x, the method determines whether merging this with the initial group of adjacent nodes for node y would increase modularity and if so, merges these two groups to form a larger merged group. The method then determines whether merging this this larger merged group with another initial group of adjacent nodes will increase modularity. If so 435Y the method moves onto step 440, otherwise 435N the method returns to step 425 to process the next initial group of adjacent nodes.

At step 440, the method 400 groups or merges these groups to form a supergroup. Larger supergroups may be formed by further merging with other initial groups of adjacent nodes, other merged groups and supergroups until further merging no longer results in any increase in modularity. This process is repeated starting with each initial group of adjacent nodes determined from step 415. This may be expressed as finding $j_0=\mathrm{argmax}_i(H(i))$ for each node i, with $P_i\neq\varphi$, $G(i)=j_0$ and $H(i)=T(P_i,P_{j0})$ if $H(i)\leq T_x(P_i,P_{j0})$.

At step 445, the method 400 has considered all nodes and returns the detected groups of interconnected nodes. The output of the method may be a series of groups of nodes. These may then be used to reconfigure the network, for example adding redundancy to some connections, adding bandwidth to some connections whilst reducing bandwidth to other connections and so on.

Embodiments may provide a number of advantages including faster detection of groups of interconnected network nodes and being more scalable for large and/or dense complex networks. The network modularity can be optimized in a short period and the embodiments provide good estimates of groups of interconnected nodes, Once the communities are detected, characteristics of these communities can be determined such as the most influential nodes.

The classical computing approaches reach a practical limit as the network gets larger, whereas the quantum computing approach of the embodiments scales more slowly in terms of the gates and qubits required and is therefore able to process large heterogenous networks such as 5G telecommunications networks. The ability to process such large, complicated and heterogeneous networks allows for the more efficient and effective use and allocation of resources within the network.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim or embodiment, "a" or "an" does not exclude a plurality, and a single processor or other unit may fulfil the functions of several units recited in the statements below. Where the terms, "first", "second" etc are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of using a quantum computing device to detect a group of interconnected nodes in a communication network, the method comprising:
- determining initial groups of adjacent nodes based on maximising modularity using the quantum computing device, the quantum computing device comprising a quantum circuit having one or more oracles coupled to registers associated with nodes of the network and initial groups of adjacent nodes for each said node;
- detecting a group of interconnected nodes by grouping the determined initial groups of adjacent nodes based on maximising modularity; and
- configuring resources of the communication network based on the detected group of interconnected nodes with maximized modularity.

2. The method of claim 1, wherein detecting the group of interconnected nodes comprises grouping the determined initial groups of adjacent nodes where modularity is increased.

3. The method of claim 2, comprising iteratively grouping the determined initial groups of nodes until modularity no longer increases.

4. The method of claim 1, wherein the quantum computing device comprises an oracle having a first matrix for interacting with registers corresponding to the interconnected nodes and initial groups of adjacent nodes to maximise a modularity function.

5. The method of claim 4 wherein the first matrix comprises an adjacency matrix of the network and a second matrix dependent on degrees of the interconnected nodes.

6. The method of claim 1, wherein determining the initial groups of adjacent nodes comprises calculating G(i)=arg-$\max_{j \neq i}$Tx($P_i$,$P_j$) for each node i where $$T_X(P_i, P_j) = \frac{1}{m}\sum\nolimits_{l_0 \in i, l_1 \in j} B_{l_0 l_1}$$

increases, wherein i represents a node, G(i) represents a graph of network nodes, $P_i$ represents the group of interconnected nodes, $P_j$ represents the group of adjacent nodes, Tx represents a difference in modularity between $P_i$ and $P_j$, $\text{argmax}_{j \neq i}$ represents a maximum modularity of any grouping of adjacent nodes, m is the sum of degrees, B represents a real symmetric matrix of qubits.

7. The method of claim 1, wherein the using the quantum computing device comprises executing a quantum circuit an order of root N times where N is the number of nodes and the quantum circuit comprises an oracle to determine G(i), G(i) representing a graph of network nodes.

8. An apparatus for detecting a group of interconnected nodes in a communication network, the apparatus comprising a processor and memory, the memory containing instructions executable by the processor such that the apparatus is operable to:

determine initial groups of adjacent nodes based on maximising modularity using a quantum computing device, the quantum computing device comprising a quantum circuit having one or more oracles coupled to registers associated with nodes of the network and initial groups of adjacent nodes for each said node;

detect a group of interconnected nodes by grouping the determined initial groups of adjacent nodes based on maximising modularity; and configure resources of the communication network based on the detected group of interconnected nodes with maximized modularity.

9. The apparatus of claim 8, wherein detecting the group of interconnected nodes comprises grouping the determined initial groups of adjacent nodes where modularity is increased.

10. The apparatus of claim 9, operable to iteratively group the determined initial groups of nodes until modularity no longer increases.

11. The apparatus of claim 10, wherein the oracle comprises an adjacency matrix of the network and a second matrix dependent on the degrees of the nodes.

12. The apparatus of claim 11, wherein the quantum circuit comprises seven registers, a first three registers representing nodes of the network and coupled to a first oracle, a second three further registers representing initial groups of adjacent nodes and coupled to a second oracle.

13. The apparatus of claim 12, wherein the quantum circuit comprises a further register coupled to a unitary matrix representing the network and interacting with a register from each of the first and second three registers.

14. The apparatus of claim 13, wherein the quantum circuit comprises a measurement gate coupled to one of the first three registers.

15. The apparatus of claim 8, the apparatus determining the initial groups of adjacent nodes by calculating G(i)=$\text{argmax}_{j \neq i}$ Tx($P_i$,$P_j$) for each node i where $$T_X(P_i, P_j) = \frac{1}{m}\sum\nolimits_{l_0 \in i, l_1 \in j} B_{l_0 l_1}$$

increases, wherein i represents a node, G(i) represents a graph of network nodes, $P_i$ represents the group of interconnected nodes, $P_j$ represents the group of adjacent nodes, Tx represents a difference in modularity between $P_i$ and $P_j$, $\text{argmax}_{j \neq i}$ represents a maximum modularity of any grouping of adjacent nodes, m is the sum of degrees, B represents a real symmetric matrix of qubits.

16. The apparatus of claim 8, the apparatus to use the quantum computing device by executing a quantum circuit an order of root N times where N is the number of nodes and the quantum circuit comprises an oracle to determine G(i), G(i) representing a graph of network nodes.

17. The apparatus of claim 16, wherein the quantum circuit comprises a register initialised to a state.

18. A non-transitory computer readable media storing a computer program comprising instructions which, when executed on at least one processor, cause the at least one processor to carry out a method to detect a group of interconnected nodes in a communication network, the method comprising:

determining initial groups of adjacent nodes based on maximising modularity using a quantum computing device, the quantum computing device comprising a quantum circuit having one or more oracles coupled to registers associated with nodes of the network and initial groups of adjacent nodes for each said node;

detecting a group of interconnected nodes by grouping the determined initial groups of adjacent nodes based on maximising modularity; and configuring resources of the communication network based on the detected group of interconnected nodes with maximized modularity.

* * * * *